United States Patent

Cohen

[15] 3,646,426

[45] Feb. 29, 1972

[54] ELECTRONICALLY TUNABLE MICROWAVE FREQUENCY MULTIPLIER

[72] Inventor: Morris Cohen, Oceanside, N.Y.

[73] Assignee: Loral Corporation, Scarsdale, N.Y.

[22] Filed: Sept. 4, 1970

[21] Appl. No.: 69,668

[52] U.S. Cl. ..............................321/69 NL, 330/4.8, 333/76

[51] Int. Cl. ........................................H02m 5/06, H03f 7/00

[58] Field of Search..............321/69, 69 NL, 69 W; 307/883; 333/73, 76; 330/4.8, 4.9

[56] References Cited

UNITED STATES PATENTS

| | | | |
|---|---|---|---|
| 3,287,621 | 11/1966 | Weaver | 321/69 NL |
| 3,311,812 | 3/1967 | Geiszler et al | 321/69 W |
| 3,260,852 | 7/1966 | Heiter | 321/69 NL |
| 3,376,495 | 4/1968 | Leonard | 321/69 NL |
| 3,544,880 | 12/1970 | Kaufman et al. | 321/69 NL |
| 3,381,207 | 4/1968 | Guthrie | 321/69 W |

*Primary Examiner*—Gerald Goldberg
*Attorney*—Charles E. Temko

[57] ABSTRACT

An electronically tunable microwave frequency multiplier capable of operating over octave frequency bands in second, third and fourth harmonic modes to yield a continuous output over a desired range. The device includes a fixed coaxial low-pass filter designed to cut off at the highest fundamental frequency, a point contact diode to generate the harmonics, an electronically tuned garnet filter used to tune to the desired harmonic which is then emitted from an output port, and a DC return fed through an RF bypass capacitor and out to a series of resistors used to effect an optimum self-bias on the diode for the optimum conversion loss for the desired harmonic band.

3 Claims, 1 Drawing Figure

PATENTED FEB 29 1972 3,646,426
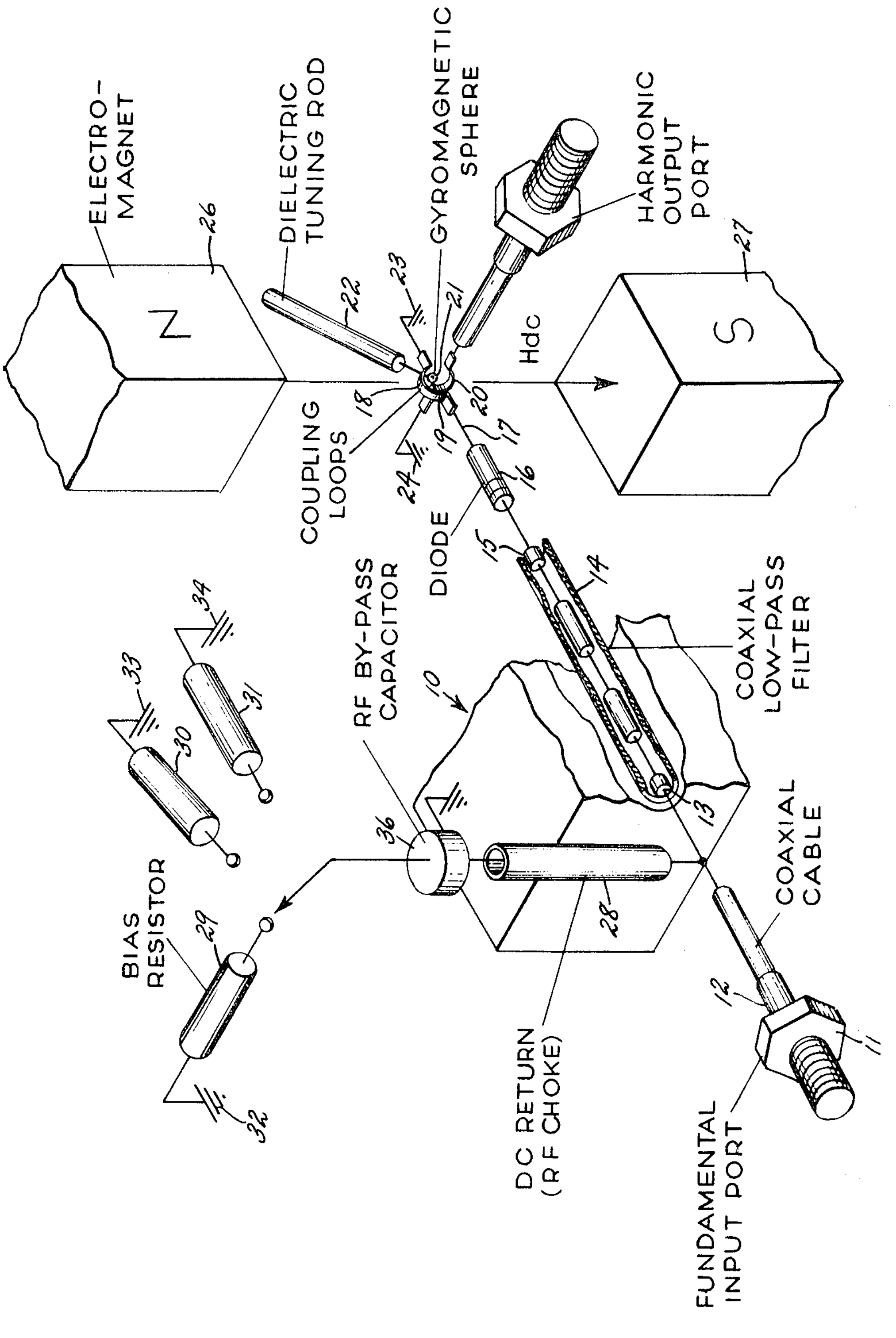

ELECTRONICALLY TUNABLE MICROWAVE FREQUENCY MULTIPLIER

This invention relates generally to the field of frequency multiplication of microwave signals, and more particularly to an improved electronically tunable microwave frequency multiplier employing a gyromagnetic filter to obtain desired multiples of a given fundamental frequency.

For certain electronic applications, it is desirable to employ signals of much higher frequency than are readily obtainable as an input signal. It is known in the art to use a series of oscillators for obtaining a signal of desired frequency, in which the output of one oscillator is fed to the input of another. It is often desirable to eliminate such structure, and obtain multiples of the second, third and fourth order at a single stage.

It is among the principal objects of the present invention to provide an improved electronically tunable microwave frequency multiplier employing a tunable gyromagnetic filter in conjunction with a point contact diode for producing harmonic outputs from an input signal.

Another object of the invention lies in the provision of an improved electronically tunable microwave frequency multiplier which may be of relatively simple construction.

Yet another object of the invention lies in the provision of a device of the class described incorporating means for obtaining optimum self-bias on the diode component thereof.

These objects, as well as other incidental ends and advantages, will more fully appear in the progress of the following disclosure, and be pointed out in the appended claims.

In the drawing, to which reference will be made in the specification, the single FIGURE is a schematic perspective view showing an embodiment of the invention.

BRIEF DESCRIPTION OF THE INVENTION

Briefly stated, the invention contemplates an input port receiving a fundamental frequency, which feeds a fixed coaxial low pass filter designed to cut off at the highest fundamental frequency. The fundamental frequency is fed through the filter to a point contact diode which generates harmonics of the fundamental frequency. The output of the diode is fed to an electronically tuned (via an electromagnet) garnet (YIG) filter used to tune to the desired harmonic which is then emitted from an output port. A DC return is fed through an RF bypass capacitor, and out to a series of resistors used to obtain optimum self-bias on the diode for the optimum conversion loss for the desired harmonic band. The value of resistance differs depending upon whether second, third or fourth harmonic operation is required.

DETAILED DESCRIPTION OF THE EMBODIMENT

In accordance with the invention, the device, generally indicated by reference character 10, comprises an input port 11 into which a fundamental frequency is fed. The port 11 is connected through a coaxial cable 12 to an input terminal 13 of a coaxial low pass filter 14, the output terminal 15 thereof being connected to a point contact diode 16 capable of producing second, third, fourth and other harmonic frequencies. An output conductor 17 connected to the diode 16 communicates with a gyromagnetic filter 18 of well-known type, including input and output loops 19 and 20, respectively, which surround a YIG sphere 21 mounted on a dilectric tuning rod 22.

The input loop 19 is grounded at 23, and the output loop 20 is grounded at 24, as well as being connected to an output port 25. As is known in the art, the filter 18 is tuned by varying the field between a pair of electromagnets 26 and 27, either manually or by mechanical sweep.

A DC return 28 is connected through ground to the input end of the filter 14. The return includes a plurality of bias resistors 29, 30 and 31, grounded at 32, 33 and 34, respectively, and selectively interconnectable through a rotary switch 35 to a RF bypass capacitor 36 in series with a RF choke 37.

THEORY OF OPERATION

The theory of operation can best be described by employing a typical set of operating frequencies, e.g., assuming that all frequencies in the range of 2.0 Gc. through 4.0 Gc. be doubled to the frequency range 4.0 Gc. through 8.0 Gc., the broadband DC return (RF choke) is designed to be a quarter wavelength long at the center fundamental frequency (for this case 3.0 Gc.) and the low pass coaxial filter is designed to cut off at 4.0 Gc. The output of the coaxial low pass filter is connected directly to the diode (the harmonic generating device), and the output of the diode is connected directly to the input loop of the gyromagnetic filter. The output loop of the filter is directly connected to the output port of the multiplier, for subsequent utilization of the multiplied frequency.

In order to verify the design technique, a multiplier of the type described was fabricated and tested. The measured results are given in tabular form.

| Input Frequency (Gc.) | Input Power (dbm.) | Output Frequency (Gc.) | Conversion Loss (db.) |
|---|---|---|---|
| 2.0 | +16 | 4.0 | 12.0 |
| 2.2 | +16 | 4.4 | 11.5 |
| 2.4 | +16 | 4.8 | 13.0 |
| 2.6 | +16 | 5.2 | 13.0 |
| 2.8 | +16 | 5.6 | 13.0 |
| 3.0 | +16 | 6.0 | 13.5 |
| 3.2 | +16 | 6.4 | 13.0 |
| 3.4 | +16 | 6.8 | 14.0 |
| 3.6 | +16 | 7.2 | 14.0 |
| 3.8 | +16 | 7.6 | 14.0 |
| 4.0 | +16 | 8.0 | 14.5 |

It is possible to improve the conversion loss by increasing the skirt selectivity of the coaxial low pass filter. This can be accomplished by adding more sections to the filter.

I claim:

1. An electronically tunable microwave frequency multiplier comprising: a fixed coaxial low pass filter adapted to conduct over a fundamental frequency band, a point contact diode interconnected to said filter and adapted to generate harmonics of said fundamental frequency, an electromagnetically tuned gyromagnetic filter including input and output coupling loops, and electromagnet means for tuning said filter, and a direct current return having an RF bypass capacitor and variable resistance means connected to the input of said coaxial filter for effecting optimum self-bias upon said diode.

2. Structure in accordance with claim 1, in which said coaxial filter is adapted to pass signals in the frequency range of 2.0 Gc. to 4.0 Gc.

3. Structure in accordance with claim 1, in which said capacitor is connected in series with a RF choke having a length of one quarter wavelength at 3.0 Gc.

* * * * *